United States Patent [19]

Barker et al.

[11] Patent Number: 4,974,194

[45] Date of Patent: Nov. 27, 1990

[54] METHOD FOR MODIFYING INTERMINGLED TEXT OBJECT AND GRAPHIC OBJECT WITHIN AN OBJECT SET INDIVIDUALLY OR CORRESPONDINGLY

[75] Inventors: Barbara A. Barker, Round Rock; Irene H. Hernandez; Beverly H. Machart, both of Austin, all of Tex.

[73] Assignee: International Business Machines Corporation, Armonk, N.Y.

[21] Appl. No.: 445,140

[22] Filed: Dec. 4, 1989

Related U.S. Application Data

[63] Continuation of Ser. No. 266,271, Oct. 26, 1988, abandoned, which is a continuation of Ser. No. 848,103, Apr. 4, 1986, abandoned.

[51] Int. Cl.$^5$ .................. G06F 15/00; G06F 3/153
[52] U.S. Cl. .................. 364/900; 364/943; 364/943.1; 364/943.43; 364/948.1
[58] Field of Search ... 364/300, 518, 521, 200 MS File, 364/900 MS File; 340/721, 747; 400/63, 76, 83

[56] References Cited

U.S. PATENT DOCUMENTS

| | | | |
|---|---|---|---|
| 4,058,849 | 11/1977 | Fitzgerald et al. | 364/900 X |
| 4,545,434 | 10/1985 | Gioello | 364/300 |
| 4,607,966 | 8/1986 | Ueno et al. | 364/900 |
| 4,633,430 | 12/1986 | Cooper | 364/300 |
| 4,639,151 | 1/1987 | Ueno et al. | 400/76 X |
| 4,649,480 | 3/1987 | Ohki et al. | 364/300 |
| 4,674,043 | 6/1987 | Hernandez et al. | 364/900 |
| 4,683,468 | 7/1987 | Himelstein et al. | 340/747 X |
| 4,703,321 | 10/1987 | Barker et al. | 340/747 |
| 4,723,211 | 2/1988 | Barker et al. | 364/300 |

OTHER PUBLICATIONS

*IBM Technical Disclosure Bulletin*, vol. 27, No. 10A, Mar. 1985, "Icon Overlay for Superblock Structure", p. 5505.

*IBM Technical Disclosure Bulletin*, vol. 27, No. 5, Oct. 1984, "Controlling the Editing and Location of Like Objects in an Integrated Environment", p. 2955.

5th International Conf. on Pattern Recognition, 12/1–4/80, vol. 2, pp. 856–858, "A Facsimile Based Manuscript Layout & Editing System by Auxiliary Mark Recognition", Y. Suenaga et al.

3rd USA-Japan Computer Conference, 1978, 10/10–12/78, "Personal Computer-Aided Composition and Editing System", T. Matsushita et al.

*Primary Examiner*—Thomas C. Lee
*Attorney, Agent, or Firm*—J. H. Barksdale, Jr.; H. St. Julian; Casimer K. Salys

[57] ABSTRACT

A method of managing the relationship between intermingled objects of different types for editing purposes. Management is through establishing separate and combined modes of operation. When a separate mode is selected, only a selected object will be affected by an edit action. When a combined mode is selected, selection of any object will result in all objects being affected by an edit action.

5 Claims, 6 Drawing Sheets

FIG. 1

In this paragraph ~~paragraph~~ is illustrated a word which is to be deleted. An indication that h̃te word is to be deleted is the draw graphics line through the word. Also illustrated in this paragraph is a word which has been misspelled. A draw graphics line has been added to indicate that a correction is to be made.

Adjacent the edge of this paragraph is a proof-reader's note that this paragraph is to be moved to the end of the next page.

In ~~this~~ paragraph is a draw graphics indication that∧word is to be added. Also, a line has been inadvertently drawn through the word "this" in the first line.

*move to end of next page*

FIG. 2

In this paragraph ~~paragraph~~ is illustrated a word which is to be deleted. An indication that h̃te word is to be deleted is the draw graphics line through the word. Also illustrated in this paragraph is a word which has been misspelled. A draw graphics line has been added to indicate that a correction is to be made.

} *move to end of next page*

Adjacent the edge of this paragraph is a proof-reader's note that this paragraph is to be moved to the end of the next page.

In this paragraph is a draw graphics indication that a word is to be added. Also, a line has been inadvertently drawn through the word "this" in the first line.

FIG. 3

In this paragraph is illustrated a word which is to be deleted. An indication that the word is to be deleted is the draw graphics line through the word. Also illustrated in this paragraph is a word which has been misspelled. A draw graphics line has been added to indicate that a correction is to be made.

In this paragraph is a draw graphics indication that a word is to be added. Also, a line has been inadvertently drawn through the word "this" in the first line.

METHOD FOR MODIFYING INTERMINGLED TEXT OBJECT AND GRAPHIC OBJECT WITHIN AN OBJECT SET INDIVIDUALLY OR CORRESPONDINGLY

This is a continuation of application Ser. No. 07/266,271, filed Oct. 26, 1988, now abandoned, which is a continuation of application Ser. No. 06/848,103, filed Apr. 4, 1986, now abandoned.

TECHNICAL FIELD

This invention relates generally to object editing, and more specifically to managing relationships between different types of objects when the different types of objects are intermingled.

BACKGROUND OF THE INVENTION

The primary focus of the following description is toward proofing and editing text documents. The reasons are that a clear understanding of the invention can be presented, and some of the most pertinent prior art is related to text processing. However, it will be appreciated that this invention is equally applicable to the proofing and editing of other types of data.

Herein, the terms proofreading and proofing include both reading, and applying change or editing indications to, a document by a proofreader or proofer. A proofed document is a document which has already been proofread. Editing a document is a process of making changes according to the editing indications. As such, an edited document is a document which has been changed according to the editing indications. A document is meant to include an equivalent of a portion of a page, or a number of pages, of data or information provided on any medium. For purposes of explanation in this application, the information will be presented to an operator on the face of a display device included in a keyboard/display system. Editing indications will be applied to the displayed information on the face of the display by the operator under device control. The information displayed on the face of the display at any particular point in time is often referred to as a screen. A device is a keyboard, light pen, mouse, joy stick, etc. In a preferred embodiment, a keyboard and a mouse will be the devices utilized For actual editing of text, the keyboard will be the primary device. For applying editing indications to the text, the mouse will be the primary device. Both devices are well known in the marketplace today.

In the following, mention will be made of object sets. An object set is a defined segment of information and can include one or more object types. For example, a text paragraph can be both an object type and an object set. A text paragraph having a graphical figure embedded therein can be an object set, but is made up of two different object types. Hereinafter, object types and objects will be used interchangeably and are to be taken as being synonymous.

By intermingling is meant the inclusion of different object types within an object set. An example of direct inclusion as described below is the drawing of a draw graphics line through a text word. In this case, the object set space remains the same. Inclusion can also be indirect as by combining objects through redefining an object set to include different objects. In this case the object set space is enlarged. An example is including in a redefined object set a text paragraph and a following table. Prior to redefinition, the paragraph and table would have been separate object sets occupying separate defined object set spaces. From the above, an object set is defined by establishing the boundaries or metes and bounds of the object set space. For text words, the boundaries can be the spaces on either side thereof. For text paragraphs, the boundaries can be the indentations at the beginning of the paragraphs.

In proofreading a printed draft of a document, editing indications are often provided with a pencil and eraser. An example of providing an indication that editing is required is the drawing of a pencil line through a word that is to be deleted. For example, a proofreader may want the word "the" deleted from the heading Background of the Invention. This can be indicated by the proofreader drawing a pencil line through the word. However, if through inadvertence, a line were drawn through the word "of", correction can be accomplished by simply erasing the line drawn through the word "of", and then drawing a new line through the word "the". What has been described thus far is a totally manual operation.

For purposes of this application, the terms operator and user are to be taken as synonymous unless otherwise specified, and are meant to include an operator making use of an application program with a keyboard/display computer system. An operator can be a secretary and a proofer can be a principal.

Popular in the marketplace today are keyboard/display standalone, and host connected, computer workstations or systems. With these systems, operator editing of text during input keying is readily managed. The majority of the editing operations performed during input keying are basic insert, delete, and replace operations. Keying is on a keyboard with a resulting display on the workstation display device. There is generally no proofing in terms of applying change indications when editing occurs during input keying. Editing following manual proofing of printed text is also readily managed with these systems. An operator simply calls the job for display, and as during input keying, edits the displayed job according to change indications through keyboarding. However, an extension of manual proofing is to use a keyboard to input simple proofreader's marks such as slash overstrikes to text to indicate that the overstruck text is to be deleted. Here, change indications are limited to deletion, and correction of a printed error is virtually unmanageable. Removal of a slash through a character will not leave the character in the same condition. This is because part of the character will also be removed. In this paragraph, thus far, only one data or object type such as text has been addressed. If it is desired to be able to intermingle different object types, such as text and draw graphics, in order to proof a document while being displayed, presently available applications are somewhat limited in terms of capability and user friendliness. For example, the task of being able to draw a line through a displayed word is not that easy a chore. One manner of accomplishing this task is to utilize a modern day windowing application program or system, place text in one window, overlay the text window with a transparent window, enter a draw graphics mode, and draw a line in the transparent window over the desired word in the text window which is behind the graphics window. If a printed copy is then desired, the contents of the display screen can be printed. These operations are tedious and time consuming, and the best end result is a hard proofed copy.

Recently, the editing of data has been simplified with the use of image editors. After creating a document by means of a traditional editor, the operator can use an image editor to add proofreaders' marks to the document and then print the image to obtain a hard copy. Editors referred to in this paragraph are application programs A problem with using an image editor for proofreading is that the result is "dead" data. That is, the displayed data can be printed, but a separate relationship between the text and mark objects cannot be maintained if the document is re-edited. With the editor being incapable of maintaining a separate relationship between the objects, the user must redo any proofreader mark that is partially or totally erased by corrections made to the original data.

Based on the above, object editing is an old concept, and the above art is pertinent to varying degrees. However, this art falls short of either anticipating the instant invention or rendering the instant invention obvious The instant invention presents an advance over the prior art in that one object such as a paragraph made up of a number of words can be displayed, and a draw graphics line which is a different type of object can simply be drawn through one of the words. A further advance is that the different objects can be treated or managed either together or separately through simple mode selection. If a combined mode is selected, removal of the line will result in removal of the word. If a separate mode is selected, the word will remain upon removal of the line. The advantages of the above advances are improved flexibility and user friendliness.

SUMMARY OF THE INVENTION

A unique method and system are provided for managing relationships between objects of different types when the objects are intermingled and displayed. Management is through the establishment of a relationship at the time the objects are intermingled by selecting either a combined or separate management mode. If no need exists for establishing a relationship between the various objects making up an object set for editing purposes, a separate management mode is selected. If establishing a relationship between the objects is necessary, a combined management mode is selected. When operation is in the separate mode, each object in the object set can be acted upon individually and separately. When operation is in the combined mode, any action upon one object within an object set will result in all objects being acted upon in the same manner.

BRIEF DESCRIPTION OF THE DRAWING

FIG. 1 illustrates a page of a document which has been proofed by a proofreader.

FIG. 2 illustrates the page of FIG. 1 following editing by the proofreader.

FIG. 3 illustrates the page of FIG. 2 following editing by an operator according to editing indications provided by the proofreader.

FIGS. 4–7 are flow charts illustrating operator, proofreader and system operations performed in carrying out the instant invention.

DESCRIPTION OF THE PREFERRED EMBODIMENT

To begin with, it is to be assumed that an operator has used a keyboard/display host connected computer workstation or system, keyed a document, and transmitted the document to a similar system at a proofer's desk for proofing. It is also to be assumed that both systems are utilizing an application program made up of an integrated data stream capable of handling text, graphics, etc. under device control. An example of an integrated data stream is presented in U.S. patent application Ser. No. 06/645,622 filed Aug. 30, 1984 in the names of Barbara A. Barker and Rex A. McCaskill and entitled "Superblock Structure In A Multiple Data Editor.", now U.S. Pat. No. 4,723,210.

A detailed description of text, graphics and table object sets can be found in "Common Editing Arrangements For Different Object Types" by B. A. Barker and I. H. Hernandez *IBM Technical Disclosure Bulletin*, Vol. 27, No. 9, February 1985.

During proofing of the document, a page will be displayed on the face of the display device included in the system. Utilizing a mouse and draw graphics capabilities of the application, proofreader's marks are applied to the displayed page. This proofed page is illustrated in FIG. 1. With respect to this proofed page, two aspects of editing will be considered. One is editing by the proofreader of the proofreader's marks. The other is editing of this proofed page by the operator according to the proof marks applied by the proofreader.

In FIG. 1, there are three paragraphs making up the page of a document. In the first line of the first paragraph, the proofreader has drawn a line through one of the words "paragraph". The drawing of the line is under mouse control utilizing draw graphics capabilities. Since drawing the line through the word implies that both the line and the word "paragraph" are to be deleted, the proofreader establishes a combined relationship between the line and the word by selecting a combined management mode. If the combined management mode is established as a system default, it is still to be considered as having been selected. In like manner, if the separate management mode is a system default, it is to be considered as having been selected when operation is in the separate management mode. Upon later editing by an operator, both the line and the word "paragraph" will be deleted because of the combined relationship. In the second line of the first paragraph, the proofreader has drawn a line to indicate that the word "the" has been misspelled. In this case a separate management mode is selected. The reason is that upon editing only the line needs to be deleted. The word spelling can thereafter be corrected by keying a "t" over the "h" and a "h" over the "t". Removal of the draw graphics line and other manners of spelling correction will be addressed later herein.

Adjacent the left edge of the second paragraph, the proofreader has drawn a bracket and added the draw graphics words "move to end of next page". Since only the paragraph needs to be moved, a separate management mode is selected. Upon later editing by the operator, this paragraph will be moved and no longer appear on this page. However, the bracket and words will remain unless explicitly deleted.

In the first line of the third paragraph, the proofreader has drawn a line through the word "this" to indicate to the operator that the word is to be deleted upon later editing. Again, since drawing the line through the word implies that both the line and the word "this" are to be deleted, a combined management mode is selected. In the second line, a caret symbol and the word "a" have been added by the proofreader to indicate to the operator that a word is missing and is to be added upon editing. Here, an object set including the "a" and the caret is defined, and a combined management mode is selected. Following deletion, an "a" is keyed on the keyboard for insertion between the words "that" and "word".

The drawing of the line by the proofreader through the word "this" in the first line of the third paragraph was in error and correction in terms of removal of the line will be through editing by the proofreader. Since both the line and the word are being managed in a combined relationship mode, the proofreader must change the mode to a separate management mode. Changing from combined to separate management mode will result in the word and the line being treated separately. The proofreader can now select the line and delete it. Selection of the line can be by using the mouse, fetching a pointing cursor, bringing the pointing cursor coincident with the line, and depressing a button on the mouse to select the line. Entering of a delete mode to thereafter delete the line can be by keying on a keyboard or depressing a mouse button a number of times sufficient to indicate such a mode. Following entering of a delete mode, deletion can be caused upon mouse button depression. Selection of an object, entering of a mode, and deletion of an object, can be accomplished in any number of well known manners, and form no part of this invention.

Following editing by the proofreader, the page will appear as shown in FIG. 2. The page of FIG. 2 is to then be transmitted to an operator for editing. The first editing task to be performed by the operator is to delete the word "paragraph" and the line drawn therethrough in the first line of the first paragraph. The operator actions are to select either the word or the line, enter a delete mode, and delete the word or the line. Since the word and the line are being managed in a combined mode, the result of an editing action such as delete will affect all intermingled objects when any one of the objects is selected.

Management of object sets can be under default system control such that spaces define or bracket each object set. With spaces defining object sets, each word will be an object set. This is in addition to the fact that each word will be an object. When a line is drawn through a word, the word and line will make up the object set. The reason objects and object sets must be defined is to control what is to be selected and deleted.

When the misspelled word in the second line of the first paragraph is considered, there are intermingled text and graphics in the same object set. This is so even though the draw graphics line may not be touching any of the characters. There are different ways in which correction can be handled. It may be preferable to delete both the line and word, and then rekey the word correctly spelled. To eliminate the need for two edit actions, the operator could be allowed to change the management mode to combined After the mode has been changed, the operator can select either the line or the word, indicate a delete edit action and both the line and the word will be deleted. However, since a separate management mode has been established, the operator can select the line and delete it, and then through a normal write-over text editing operation key a "t" over the "h" and an "h" over the following "t".

Movement f the second paragraph can be through a normal text paragraph move operation. This will leave in place the bracket and the "move to end of next paragraph" draw graphics wording which must be removed. Here, default system control for defining object sets will not suffice With this being the case, the bracket and wording must be defined. This can be by specifying X and Y coordinates of the outer extremities of the bracket and wording and establish a combined relationship. Thereafter, if either the bracket or wording is selected and a delete action is specified, both the bracket and wording will be deleted.

The advantages of utilizing the capabilities described above are that the time and effort required to print out multiple drafts are avoided, paper costs are reduced, a proofer's actual proofing time and efforts are about the same as with manual proofing, editing turnaround time is improved, the tedium of correlating a printed draft to changes on a display is reduced, and the chances of error and omission by an operator are reduced. The greatest advantage is that a proofer can substantially operate in a traditional manner. Only the equipment is changed. Instead of a pencil and eraser, a mouse or light pen and a keyboard are used. In addition, the proofer can readily go forward and perform operator functions with the same equipment.

Set out below is an illustration of an application program useable by the proofer and operator workstations for facilitating proofing and editing documents according to this invention. This program is in program design language from which source and object code are derivable.

The assumption is that a document has been created by an operator using an integrated multiple data editor and is ready to be transmitted to a similar system at a proofer's desk for proofing.

```
Call Init_Flag(Doc_Proofed)
Call Init_Flag(Doc_Edited)
Repeat
if Doc_Proofed Flag is Off
Then Repeat
Call Select_Obj_Set(O_Set)
Case Obj_Selection Reason of
Case: 'Obj_Set Needs Proofing'
Call Proof_Obj_Set(O_Set) Subroutine
Call Select_Obj_Rel(O_Rel_Yes)
If O_Rel_Yes
Then Call Set_Mode(O_Set, Combined)
Else Call Set_Mode(O_Set, Separate)
Endif
Case: 'Proofer Made a Mistake',
'Operator Inserted a Comment'
Call Display_Panel(E_Correct)
If Not E_Correct
Then Call Query_Mode(I_Mode)
If I_Mode = Combined
Then Call Set_Mode(O_Set,
Separate)
Endif
Call Select_Obj(E_Marks)
Call Delete_Obj(E_Marks)
Call Redef_Obj_Set(O_Set)
Else If Operator Inserted a Comment
Then
Call Set_Mode(E_Comment,
Separate)
Call Select_Obj(E_Comment)
Call Delete_Obj(E_Comment)
Call Redef_Obj_Set(O_Set)
Endif
Endif
EndCase
Until Obj_Set Proofing is Complete
Call Set_Flag(Doc_Proofed, On)
Else Repeat
Call Init_Flag(Com_Inserted)
Call Locate_Obj(E_Marks)
Call Display_Panel(E_Correct)
If E_Correct
```

```
            -continued
        Then Call Select__Obj(E__Marks)
        If Indicated Edit Action <> 'DELETE'
        Then Call Execute__Action(Delete,
         E__Marks) subroutine
        Call Select__Obj(O__Set)
        Call Get__User__Input(I__Input)
        I__Action = Edit Action
        Assigned to I__Input
        Else I__Action = 'DELETE'
        O__Set = E__Marks
        Endif
        Call Execute__Action(I__Action, O__Set)
        Subroutine
        Call Redef__Obj__Set(O__Set)
        Else Get__Graphics__Input(G__Data,
         Cur__Array)
        Call Retrieve__G__Boundary(Cur__Array,
         X__Pos1, Y__Pos1, X__Pos2, Y__Pos2)
        Call Set__Flag(Com__Inserted, On)
        Call Select__Obj(O__Set)
        Call Redef__Obj__Set(O__Set)
        Endif
        Until Editing Complete
        If Com__Inserted
        Then Call Set__Flag(Doc__Proofed, Off)
        Else Call Set__Flag(Doc__Edited, On)
        Endif
        Endif
        Until Doc__Proofed and Doc__Edited Flags Are On
        Subroutine Proof__Obj__Set(O__Set)
        Call Display__Panel(E__Tools)
        Repeat
        Call Get__User__Input(I__Input)
        Case I__Input of
        Case: 'Edit Indication Tool Selected'
        Call Track__Cursor(X__Pos, Y__Pos) Subroutine
        Call Position__Obj(E__Ind, X__Pos, Y__Pos)
        Case: 'Edit Indication Key Pressed'
        Call Get__Graphics__Input(G__Data, Cur__Array)
        Call Retrieve__G__Boundary(Cur__Array,
         X__Pos1, Y__Pos1,
         X__Pos2, Y__Pos2)
        Case: Otherwise
        EndCase
        Until Proof__End Key is Pressed
        Call Redef__Obj__Set(O__Set)
        Subroutine Track__Cursor(X__Pos, Y__Pos)
        Repeat
        Call Get__Cursor__Pos(X__Pos, Y__Pos)
        Until Cursor Movement Stops
        Subroutine Execute__Action(I__Action, O__Set)
        If I__Action = 'DELETE'
        Then Call Query__Mode(I__Mode)
        If I__Mode = Combined (*O__Set = E__Marks*)
        Then Call Delete__Obj(C__Objs)
        Else Call Delete__Obj(O__Set)
        Endif
        Else Perform Indicated Action
        Endif
```

Insert, Replace, Move, Copy, etc. code is similar to that of these routines in commonly known editor application programs and will not be described at this time.

After an operator has completed the keying of a document using an integrated multiple data editor, a routine is called to initialize each of the control flags (CALL INIT_FLAG(DOC_PROOFED); CALL INIT_FLAG(DOC$_{13}$ EDITED)). These flags are used by the system to determine if the document should be transmitted either to the proofer (DOC_PROOFED), who will insert edit marks, or to the operator (DOC_EDITED), who will make the changes indicated by the edit marks. The INIT_FLAG routine ensures that each of the control flags is turned off before beginning the proof/edit cycle.

Since the DOC_PROOFED flag is off, the system transmits the document to the proofer. The proofer can proof the document contents in any order. The object sets in the document can be examined sequentially or at random. The proofer performs a visual examination first. If there is an error in an object set, the proofer points to the object set with a mouse or other pointing device, and a routine is called to select the object set (CALL SELECT_OBJ(O_SET)). If the object set (O_SET) has not been previously proofed or has not been graphically commented by the operator, the Proof_Obj_Set subroutine is called (CALL PROOF_OBJ_SET(O_SET)).

The PROOF_OBJ_SET subroutine displays a panel containing graphical proofmark tools (CALL DISPLAY_PANEL(E_TOOLS)). The tools are icon representations of standard proofreaders' marks. The proofer can select one of these tools to indicate to the operator the corrections that need to be made to the object set. After the panel is displayed, the system calls a routine to monitor the proofer's selection (CALL GET_USER_INPUT(I_INPUT)). Once a tool is selected, a subroutine is called to track the movement of the mouse cursor as the proofer selects a position for the edit mark (Call TRACK_CURSOR(X_POS, Y_POS)). The TRACK_CURSOR subroutine continuously polls the current position of the cursor (CALL GET_CURSOR_POS(X_POS, Y_POS)). After cursor movement stops, a routine is called to position the edit mark at the last cursor location (CALL POSITION_OBJ(E_IND, X_POS, Y_POS)).

If the proofer selects the EDIT INDICATION key, the PROOF_OBJ_SET subroutine provides a freehand proofmark tool that can be used to interactively draw an edit mark at the desired location. This tool can also be used to enter graphical text. When the proofer activates the freehand tool, the system calls a graphics input routine to get the input of the proofer (Call Get_Graphics_Input(G_Data, Cur_Array)). The Get_Graphics_Input Routine can use any of a number of well known graphics' application tracking routines to record the data (G Data) generated in the freehand drawing. As the data is being recorded, the X,Y positions of the cursor are placed into an array (Cur_Array). After the freehand tool is released, the system calls a routine to retrieve the X,Y positions of the outer extremities of the object set defined by the freehand drawing (Call Retrieve _G_Boundary(Cur_Array, X_Pos1, Y_Pos1, X_Pos2, Y_Pos2)).

As long as the PROOF_END key has not been pressed, the proofer can select and insert another proofmark or graphically enter an edit indication or text. After the PROOF_END key is pressed, a routine is called to redefine the proofed object set to include the edit marks (CALL REDEF_OBJ_SET(O_SET)). The system redefines the proofed object set by linking the edit marks into the data structure used to represent the object set. In the data structure the edit marks are an object set that is contained in the original object set.

The above data structure is called a superblock and has been disclosed in Ser. No. 06/645,622 filed Aug. 30, 1984 in the names of Barbara A. Barker and Rex A. McCaskill for "Superblock Structure In A Multiple Data Editor." now U.S. Pat. No. 4,123,210. The object sets within the superblock structure are managed by links in a hierarchical fashion, and the system treats each object set as a peer to each of the other object sets within the superblock. To implement the present invention, forward and backward management mode pointers and a management mode attribute must be added to the object set data structure. When the proofer indicates that two or more object sets are to be managed in combined mode, the system links the object set data structures with the management mode pointers, and sets the management mode attribute to combined. The management mode pointers in object sets that are being managed separately would have a null value, and the management mode attribute would be set to separate.

The editing of a superblock is disclosed in U.S. patent application Ser. No. 06/645,630 filed Aug. 30, 1984 in the names of Barbara A. Barker, Irene H. Hernandez and Rex A. McCaskill for "Editing of a Superblock Structure," now U.S. Pat. No. 4,723,211, and the redefinition of the superblock data structure, as far as simple insertion/deletion of data is concerned, is disclosed in Ser. No. 06/645,620 filed Aug. 30, 1984 in the names of Barbara A. Barker and Irene H. Hernandez for "Implicit Creation of A Superblock Structure.", now U.S. Pat. No. 4,739,477.

At this point the proofer must decide if the edit marks should be managed separately or combined in a relationship with the selected object set (CALL SELECT_OBJ_REL(O_REL_YES)). If the proofer presses the COMBINE key, selecting a combined management mode, the object relationship parameter (O_REL_YES) is set to true, and a routine is called to set the management mode (i.e. activate the management mode pointers, and set the management mode attribute) to combined (CALL SET_MODE(O_SET, COMBINED)). If O_REL_YES is false, the SET_MODE routine is called to set the management mode to separate (CALL SET_MODE(O_SET, SEPARATE)). When an object set in combined management mode is cursored by either the proofer or the operator, the system displays brackets around the object set. An object set that is being managed separately is not bracketed.

If the selected object set has been previously proofed, or if the operator has inserted a comment relative to the edit marks, the proofer must decide whether the edit marks need to be revised or removed completely. The system calls a routine to display a message panel in which the proofer is asked to indicate whether the edit marks (E_MARKS) are correct (CALL DISPLAY_PANEL(E_CORRECT)). If the proofer indicates that an error in proofing has occurred, and the selected object set is being managed in a combined relationship (CALL QUERY_MODE(I_MODE)), a routine is called to set the management mode to separate (CALL SET_MODE(O_SET, SEPARATE)). Next, the proofer points to the edit marks object with the mouse or other pointing device, and a routine is called to select the edit marks associated with the selected object set (CALL SELECT_OBJ(E_MARKS)). The proofer presses the DELETE key, and a routine is called to delete the edit marks (CALL DELETE_OBJ(E_MARKS)). If a comment exists, the DELETE_OBJ routine will delete the comment when the edit marks are deleted. This action occurs because the system activated the management mode pointers between the edit marks and the comment when the operator inserted the comment.

If the proofer indicates that the edit marks are correct and an edit comment has been inserted, the proofer points to the edit comment with the mouse and a routine is called to select the edit comment (CALL SELECT_OBJ(E_COMMENT)). At this time the system automatically sets the management mode attribute for the comment to separate ad sets the management mode pointers to null (CALL SET_MODE(E_COMMENT, SEPARATE)). The proofer presses the DELETE key, and the DELETE_OBJ routine is called to delete the edit comment. After deleting either the edit marks and/or the edit comment, a routine is called to redefine the object set by removing the data structure management mode links that pointed to the edit marks and/or the edit comment, and to set the management mode attribute for the affected object sets to separate (CALL REDEF_OBJ_SET(O_SET)).

The above instructions are repeated until the PROOF_END key is pressed indicating that proofing of the document has been completed. When proofing is completed, a routine is called to turn on the DOC_PROOFED flag (CALL SET_FLAG(DOC_PROOFED, ON)). At this time, the document is transmitted to the operator for editing, since the DOC_EDITED flag is still off. Prior to the start of the edit cycle, a routine is called to initialize the edit comment flag that will be used to indicate that a document needs to be returned to the proofer (CALL INIT_FLAG(COM_INSERTED)).

When the LOCATE EDIT_MARK key is pressed, a routine is called to locate the first edit mark object (CALL LOCATE_OBJ(E_MARKS)). The system calls a routine to display a message panel in which the operator is asked to indicate whether the edit marks are correct (CALL DISPLAY PANEL(E_CORRECT)). If the edit marks are correct, a routine is called to select the edit mark object set (CALL SELECT_OBJ(E_MARKS)). If the management mode is combined, the object set in the combined relationship with the edit mark object set is also selected. If the indicated edit action is not delete, i.e. the action is insert, replace, move, copy, etc., the edit marks must be deleted before the object set can be edited. The operator presses the DELETE key, and the system calls the execute action routine to delete the edit marks (CALL EXECUTE_ACTION(DELETE, E_MARKS)). Next, the operator points to the object set to be edited, and a routine is called to select the object set (CALL SELECT_OBJ(O_SET)). At this point the system must wait for the operator to press the function key assigned to the indicated edit action (Call Get_User_Input(I_Input)). When the function key that has been assigned to the indicated edit action is pressed, the EXECUTE_ACTION subroutine is called with the indicated action (I_ACTION) and object set (O_SET) as input parameters. Actions such as insert, replace, move and copy function in a manner similar to those implemented in commonly known editor applications, and will not be described at this time. If the edit action is delete, the EXECUTE_ACTION subroutine is called with I_ACTION=DELETE and O_SET=E_MARKS. If the management mode is combined (CALL QUERY_MODE(I_MODE)), the DELETE_OBJ routine is called to delete the edit marks plus the objects combined with the edit marks (CALL DELETE_OBJ(C_OBJS)). After the system executes the edit action, a routine is called to redefine the object set by removing the data structure links that pointed to the edit marks and deleted data objects, and by adding links to data that may have been appended to the object set, and also to set the management mode pointers to null and the management mode attribute to separate (CALL _REDEF OBJ_SET(O_SET)).

If the operator does not agree with the edit marks, the EDIT COMMENT key is pressed. When the operator presses the Edit Comment key, the system provides a freehand drawing tool that can be used to interactively enter a graphical text comment. The system calls a graphics input routine to get the input of the operator (Call Get_Graphics_Input(G_Data, Cur_Array)). As previously stated, the Get_Graphics_Input routine can use any of a number of well known graphics application tracking routines to record the data (G_Data) generated in the graphical text comment. The system places the X,Y positions of the cursor into an array (Cur_Array). After the operator releases the drawing tool, the system calls a routine to retrieve the X,Y positions of the outer extremities of the object set defined by the graphical text comment (Call Retrieve_G_Boundary(Cur_Array, X_Pos1, Y_Pos1, X_Pos2, Y_Pos2)). Next, a routine is called to turn on the COM_INSERTED flag (CALL SET_FLAG(COM_INSERTED, ON)), and the REDEF_OBJ_SET routine is called to redefine the object set by inserting data structure links to the comment object in the object set associated with the edit marks, and to activate the management mode pointers between the comment and the edit marks and to set the management mode attribute for the comment and edit marks to combined.

The edit cycle continues until the operator indicates that editing of the document is complete by pressing the EDIT_END key. If the COM_INSERTED flag is off, a routine is called to turn on the DOC_EDITED flag (CALL SET_FLAG(DOC_EDITED, ON)). However, if the COM_INSERTED flag is on, the SET_FLAG routine is called to turn off the DOC_PROOFED flag (CALL SET_FLAG(DOC_PROOFED, OFF)). If the DOC_PROOFED flag has been turned off, the document is returned to the proofer. The Proof/Edit application is terminated when both the DOC_PROOFED and DOC_EDITED flags are on.

For a more detailed understanding of the invention, reference is next made to FIGS. 4-7. The flow charts of FIGS. 4, 5, 6 and 7 illustrate operator, proofreader, and system operations for managing object relationships. The application that supports these operations is capable of interactively intermingling text and graphics in a WYSIWYG (what you see is what you get) editing environment.

At the start of the application, the flags that indicate the completion of proofing and editing must be initialized (turned off). Block 10 indicates the initialization of these flags. Since the Document Proofed flag is off, the control flow is from block 11 to block 12, where the proofer must select an object set that needs to be proofed, an object set that has been incorrectly proofed or an object set in which a comment has been inserted by the operator. If the selected object set already contains edit marks or if it contains a comment, control passes to either block 18 or 19. If the object set contains no edit marks or comment, it has been selected for proofing.

If the object set is elected for proofing, control passes through block 13 to block 14, where the Proof Object set subroutine is called. Block 50 of FIG. 5 indicates the start of the Proof Object set subroutine. At block 51 a panel containing graphical proofmark tools is displayed to the proofer. The proofer has the choice of selecting one of the tools (Block 53), of pressing the Edit Indication key (Block 56), or of doing something not related to proofing (Block 62). As shown in block 52, the system waits for the proofer to perform an action that will indicate the choice that is to be made.

Control flows from block 52 through block 53 to block 54 if a proofmark tool is chosen. After a tool is chosen, the system must track the movement of the mouse cursor as the proofer uses the tool to insert the edit indication mark. The mouse is continuously polled for the current x,y position of the cursor until cursor movement stops The tracking of the mouse cursor is shown in blocks 70 through 73 of FIG. 6. At block 73 control returns to block 55 of FIG. 5, where the edit mark is positioned at the last cursor location. If the proofer presses the proof end key, proofing of the object set is terminated. A test for the occurrence of this action is shown in block 59. If the proof end key is not pressed, control returns to block 52, where the system waits for input from the proofer.

If the proofer presses the Edit Indication key, control flows from block 52 through block 56 to block 57. At this point the system provides a freehand tool that the proofer can use to interactively draw an edit mark or to enter graphical text. As the proofer uses the tool, the system records each location of the cursor during the freehand drawing mode and the bit representation of the data. After the freehand tool is released, the system must retrieve the x,y position values that will be used to define the outer extremities of the object set containing the freehand drawing. The above actions are shown in blocks 57 and 58.

If, at block 59, proofing of the object set is complete, control flows to block 60, where the system redefines the object set data structure to include the edit marks . An example of the system redefining an object set data structure to include another object set data structure is described in U.S. patent application Ser. No. 06/645,620 filed Aug. 30, 1984 in the names of Barbara A. Barker and Irene H. Hernandez for "Implicit Creation of a Superblock Structure." now U.S. Pat. No. 4,739,477. At block 63 control returns to block 15 in FIG. 4 where a test is made to determine if the edit marks object should be managed separately or combined in a relationship with the object set that was proofed. A combined management mode is set in block 16 and a separate management mode is set in block 17.

If the object set is not selected for proofing, control passes through block 18 or 19 to block 20, where the proofer must decide if the edit marks need to be revised or deleted. If the proofer indicates that there is a proofing error, control flows to block 21, where the management mode of the edit marks is tested. A combined management mode causes control to go to block 22 where the management mode is changed to separate. Next, as shown in block 23, the proofer is asked to select the edit marks object. Correction of the edit marks involves a deletion first, followed by a redefinition of the object set data structure, and reselection of the object set for proofing. In this case control goes through blocks 24 and 25 to block 28, where control is returned to block 12. At block 12, the object set must be reselected in order to be reproofed. Deletion involves selecting the delete action as shown in block 24, causing the edit marks to be removed from the display. Redefinition of the data structure occurs in block 25. During redefinition, the object set and management mode links to the edit marks are removed from the object set; the management mode attributes are set to separate.

If the operator did not indicate that a proofing error occurred, control flows from block 20 to block 26, where the system checks to see if a comment has been inserted. If a comment has been inserted, the proofer is asked to select the comment for deletion in block 27. Control flows to blocks 24 and 25 as the comment is deleted and redefinition of the object set data structure occurs. If no comment has been inserted, control flows to block 28.

A test is made at block 28 to determine if the Proof End key has been pressed. If the Proof End key is pressed, there are no more object sets that need to be proofed or checked for errors, so control flows to block 29, where the Document Proofed flag is turned on. If the Proof End key is not pressed, control returns to block 12, where the system waits for the proofer to select another object set.

After the Document Proofed flag is turned on, a test is made at block 30 to see if the document needs to be edited. Since the edit flag is off, control flows to block 11 and on to block 31, where the flag indicating that a comment has been inserted is initialized. As shown in block 32, the operator presses the Locate Edit_Mark key to start the editing process. The system locates the first edit mark, and displays a message panel in which the operator is asked to indicate if the edit marks are correct. This action is depicted by block 33. If the edit marks are correct, the operator is asked to select the edit object in block 34, and press the function key assigned to the indicated edit action. A test is made in block 35 to see if the edit action is delete. If the action is not delete, control flows to blocks 42 and 43, where the system deletes the edit marks by calling the Execute_Action subroutine shown in block 80, and asks the operator to select the object set to be edited. Control then flows to block 36, and is passed to block 80 of the Execute Action subroutine in FIG. 7. If the action is delete, control flows directly to block 36 and on to block 80.

Block 80 indicates the start of the Execute Action subroutine. If the action to be executed is delete, control flows to block 82, where the object management mode is tested. If the management mode is combined, the edit marks plus the combined objects are deleted as shown in block 83. A separate management mode implies that only the edit marks are deleted as shown in block 84. Control flows to block 85, if the action to be executed is not delete. At block 86, control is returned to block 37 in FIG. 4 for redefinition of the object set data structure. During redefinition, links to the edit mark object set are removed, and links to data that may have been appended to the object set are inserted. Management mode pointers are set to null, and the management mode attribute is set to separate.

In block 33 in FIG. 4, if the operator indicates that the edit marks are not correct, control flows to block 44, where the operator is asked to press the Edit Comment key. After the Edit Comment key is pressed, the system provides a freehand tool that the operator can use to interactively enter a graphical text comment. As the operator uses the tool, the system must save each of the cursor locations and the bit representation of the data that the operator is entering. After the text has been entered, the system must retrieve the X,Y position values that will be used to define the outer extremities of the object set containing the comment. The above actions are shown in blocks 45, 46, and 47. In block 48 the system turns on the flag indicating that a comment has been inserted. Control flows next to block 37 where the object set data structure is redefined to include a link to the edit comment object. The edit comment and the edit marks object sets are linked via the management mode pointers and the management mode attribute of both the edit comment and the edit marks object sets is set to combined.

After redefinition of the object set occurs, a test is made in block 38 to see if there are more objects to edit. If there are more objects to edit, control returns to block 32 where the system locates the next edit mark object. If there are no more objects to edit, control flows to block 39 where a test is made to see if any comments have been inserted. As shown in block 40, if comments have been inserted, the Document Proofed flag is turned off, so that the object set(s) containing the comment(s) will be reproofed. Since the Document Proofed flag is off, control will return to block 11 after the test in block 30. If no comments have been inserted, the Document Edited flag is turned on. Since both the Document Proofed and Document Edited flags are turned on, the test at block 30 will be true and the application will be terminated.

In summary, a unique method and system are provided for managing relationships between objects of different types when the objects are intermingled and displayed. Management is through the establishment of a relationship at the time the objects are intermingled by selecting either a combined or separate management mode. If no need exists for establishing a relationship between the various objects making up an object set for editing purposes, a separate management mode is selected. If establishing a relationship between the objects is necessary, a combined management mode is selected. When operation is in the separate mode, each object in the object set can be acted upon individually and separately. When operation is in the combined mode, any action upon one object within an object set will result in all objects being acted upon in the same manner.

While the invention has been particularly shown and described with reference to a preferred embodiment, it will be understood by those skilled in the art that various changes in form and detail may be made without departing from the spirit and scope of the invention.

We claim:

1. In a computer system, a computer implementing method of editing a document which has a plurality of object sets, each said object set comprises at least one intermingled text type object and graphic type object, during a review of said document, said method comprising the steps of:
(a) selecting a separate mode of operation within said system to cause one of said intermingled text type object and graphic type object from one of said object sets to be treated separately for editing purposes without regard to physical arrangement between or order of said intermingled text type object and graphic type object within said one of said object sets;
(b) selecting said graphic type object from one of said object sets within said system for editing; and
(c) selectively modifying said selected graphic type object without correspondingly modifying said intermingled text type object within said one of said object sets.

2. In a computer operated word processing system, a computer implementing method of editing a proofed document composed of a plurality of object sets, each said object set comprises at least one intermingled original text object and graphic editing object, said method comprising the steps of:

(a) selecting a mode of operation within said system from among a separate mode and a combined mode;

(b) selecting a graphic editing object from one of said object sets in said document within said system, without regard to physical arrangement between or order of said original text object and said graphic editing object within said one of said object sets;

(c) upon selecting the separate mode, modifying said selected graphic editing object in response to an edit action without correspondingly modifying said intermingled original text object within said one of said object sets; and (d) upon selecting the combined mode, modifying said original text object intermingled with said selected graphic editing object in said one of said object sets in response to an edit action defined by the selected graphic editing object.

3. A method according to claim 2 including defining an text object set.

4. A method according to claim 3 including selecting said text object set when said combined mode has been selected.

5. A method according to claim 4 including performing an edit action on said selected text object set.

* * * * *